United States Patent
Buijs et al.

(10) Patent No.: US 6,566,487 B2
(45) Date of Patent: May 20, 2003

(54) METHOD FOR POLYMERISING EPSILON-CAPROLACTAM TO POLYAMIDE-6

(75) Inventors: Wim Buijs, Schinnen (NL); Ronald J. H. Hoenen, Geleen (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/886,374

(22) Filed: Jun. 22, 2001

(65) Prior Publication Data

US 2002/0002266 A1 Jan. 3, 2002

Related U.S. Application Data

(63) Continuation of application No. PCT/NL99/00657, filed on Oct. 22, 1999.

(30) Foreign Application Priority Data

Oct. 22, 1998 (NL) ................................................ 1010373

(51) Int. Cl.$^7$ .......................... C08G 69/00; C08G 69/16
(52) U.S. Cl. ........................ 528/310; 528/318; 528/323; 526/65
(58) Field of Search ................................. 528/310, 323, 528/318; 526/65

(56) References Cited

U.S. PATENT DOCUMENTS

| | | | |
|---|---|---|---|
| 2,562,796 A | | 7/1951 | Koch |
| 3,565,866 A | | 2/1971 | Linge et al. |
| 4,204,049 A | * | 5/1980 | Matthies et al. ............ 528/323 |
| 4,327,208 A | * | 4/1982 | Lehr et al. .................. 528/323 |
| 4,354,020 A | * | 10/1982 | Rotzoll et al. ............... 528/323 |
| 5,283,315 A | * | 2/1994 | Kawakami et al. ......... 528/326 |
| 5,696,227 A | | 12/1997 | Mumcu |

FOREIGN PATENT DOCUMENTS

| | | |
|---|---|---|
| FR | 2 336 432 | 7/1977 |
| FR | 2 736 645 | 1/1997 |

* cited by examiner

*Primary Examiner*—P. Hampton-Hightower
(74) *Attorney, Agent, or Firm*—Pillsbury Winthrop LLP

(57) ABSTRACT

The invention relates to a method for the hydrolytic polymerisation of ϵ-caprolactam to polyamide-6, comprising a step (a) in which ring opening of part of the ϵ-caprolactam to the corresponding amino caproic acid is effected in the presence of water and a step (b) in which polyaddition and polycondensation are effected under preferably anhydrous reaction conditions, in which at least one of the steps (a) and (b) is carried out in a reactor in which a self-renewing interface between the molten phase and the gas phase with a large surface/volume ratio of the molten phase is effected. The method is preferably effected in an horizontal scraped-surface reactor, since relatively strong mixing of the molten phase can be achieved in these and the molten phase is present in a thin layer, a large gas volume is present having a relatively high partial pressure of the water vapour and the thin layer is constantly renewed by shear forces. The method can be carried out in one reactor, preferably with several reaction zones, or with several reactors in series.

16 Claims, No Drawings

METHOD FOR POLYMERISING EPSILON-CAPROLACTAM TO POLYAMIDE-6

This is a Continuation of International Application No. PCT/NL99/00657 filed Oct. 22, 1999 which designated the U.S. and that International Application was published under PCT Article 21(2) in English.

The invention relates to a method for the hydrolytic polymerisation of ε-caprolactam to polyamide-6 comprising a step (a) in which ring opening of part of the ε-caprolactam to the corresponding amino caproic acid is effected in the presence of water and a step (b) in which polyaddition and polycondensation are effected under preferably anhydrous reaction conditions.

Such method is well known, e.g. from Kohan, *Nylon Plastics Handbook*, Carl Hanser Verlag, Munich, 1995.

According to one embodiment, on a large industrial scale, polyamide-6 is obtained from ε-caprolactam with the VK-process (VK=Vereinfacht Kontinuerlich). This process involves molten caprolactam which contains some water, for instance 1–4 weight %, being fed in at the top of a vertical tubular reactor or a series of tubular reactors at a temperature of about 265° C. and approximately atmospheric or, if required, reduced pressure. Under these conditions, the polymerisation is initiated by ring opening of the lactam under the influence of the water (step a) in a first section of the reactor; in a following section of the reactor the polyaddition and polycondensation (step b) take place.

In general, the VK-process requires residence times of 10–20 hours to achieve a sufficiently high degree of polymerisation. This degree of polymerisation is generally expressed in terms of the relative viscosity, $\eta_{rel}$ and is generally in the order of 2.0–2.8 when measured in formic acid. If polyamide-6 having a higher degree of polymerisation is required, a solid-phase postcondensation process is employed on the polyamide obtained from the VK-process in an inert gas atmosphere or in a vacuum, thereby effecting step (b). This solid-phase postcondensation process generally requires at least another 12 hours.

During the long residence in the VK-reactor, an equilibrium is established between polyamide, monomer and oligomers, as a result of which the reaction mixture leaving the VK-reactor contains in the order of 10 weight % of monomer and 2 weight % of leachable oligomer. This low molecular-weight material must be removed from the polyamide by means of leaching using water. After processing of the extract, these low molecular-weight compounds can be recycled into the process together with the fresh lactam. Separation and work-up of these low molecular-weight compounds requires large installations, large amounts of water and high energy consumption.

Attempts have been made to improve the hydrolytic polymerisation process considerably, especially to shorten the entire polymerisation process. One way of doing so is by partly timely separating the first step (step a) in which water is added to the process from the second step (step b) in which water is removed from the process. It proved possible to shorten the total polymerisation time by a few hours making use of a so-called prepolymerisation reactor upstream of the VK-reactor, this prepolymerisation being carried out preferably likewise in a tubular reactor, at elevated pressure and under otherwise comparable conditions. A drawback of the hydrolytic polymerisation carried out in two reactors is, however, that the level of cyclic dimer, (CD), in the polyamide which ultimately leaves the VK-reactor is considerably higher than in the case of the VK-reactor being used without a prepolymerisation reactor.

It is an object of the present invention to provide a method which does not exhibit the drawbacks mentioned above or does so to a much lesser degree. More particularly, the method according to the invention should in a short time lead to a high molecular-weight polyamide-6 having a low level of low molecular-weight compounds in the polyamide in a reproducible process suitable for large-scale, preferably continuous use.

Most surprisingly, the inventors have succeeded in this by carrying out at least one of the steps (a) and (b) in a reactor in which a self-renewing interface between the molten phase and the gas phase is effected with a large surface/volume ratio of the molten phase. The surface/volume ratio is preferably greater than 10 m$^{-1}$, more preferably 40 m$^{-1}$, most preferably greater than 100 m$^{-1}$. The volume ratio molten phase/gas phase is generally less than 1, preferably less than 0.5, more preferably less than 0.2.

The method according to the invention can be effected in any reactor that has means for effecting the required large self-renewing surface. Reactors of this type are known per se and inter alia comprise stirred gas bubble scrubbers, packed column reactors and horizontal scraped-surface reactors. Horizontal scraped-surface reactors in particular are potentially suitable, since relatively strong mixing of the molten phase can be achieved in these reactors and the molten phase is present in a thin layer, and a large gas volume is present having a relatively high partial pressure of the water vapour.

Moreover, it has been found that a thin layer of which the composition is constantly renewed by shear forces, as is the case with scraped-surface reactors, is most preferred. Examples of such scraped-surface reactors are described, inter alia, in DE-A-4126425 and BE-A-649023. Found to be particularly suitable was a reactor of the turbulent-mixer type, in which axial and radial mass transfer is promoted by stirring paddles which at the same time are provided with scrapers by means of which the product is smeared over the entire internal surface of the horizontal reactor vessel, thus producing a large self-renewing surface by shear forces. Such a type of reactor is commercially available up to a total capacity of 50,000 liters, for example from Drais, Mannheim, Del.

According to a first embodiment, the ring opening (step a) and subsequent prepolymerisation is carried out with the method according to the invention. With the latter embodiment, it has been found most favourable to supply at least part of the necessary water via the gas phase to the reactor mass. The amount of water which is introduced into the reactor or reactor zone in the gas phase can vary within wide limits and is preferably chosen to be between 1 and 400 g of $H_2O$ per kg of lactam. The pressure in the reactor (zone) can be either atmospheric or elevated. Preferably, the process according to the invention will be carried out at elevated pressure. The atmosphere above the melt is generally a mixture of an inert gas and water (steam). Oxygen must be excluded as far as possible to prevent discoloration of the polyamide.

The water in the gas atmosphere can be supplemented, for example, by recirculation of the gas phase, water consumed outside the reactor (zone) being supplemented, or by injection of water in the gas phase into the reactor (zone). The first method is preferable. The second method has the additional drawback that the energy required for the evaporation of the water must be supplied by means of relatively costly facilities in the reactor (zone).

The feature of supplying the water in the gas phase to a polyamide melt has been disclosed for a melt of polylaurinelactam in FR-2,736,645 (Huls) in order to reduce the number of gels in the melt as a result of overheating and for a melt of an omega-lactam when the initial caprolactam contains less than 1% of moisture in U.S. Pat. No. 2,562,796 (Koch).

According to a second embodiment, the second step (step b) is carried out with the method according to the invention. To this end, polyamide with a low relative viscosity (<2.8) is fed into the reactor and subjected to heat and mixing while a stream of inert anhydrous gas, preferably $N_2$-gas, is drawn through the reactor. The reaction can be carried out either at atmospheric, reduced or enhanced pressure. In this way, water is continuously removed from the reaction mass very quickly, such that a polyamide with a higher relative viscosity, more in particular with a viscosity of 2.8–3.5 is obtained very quickly.

According to a third embodiment, both the ring opening and prepolymerisation and the polyaddition and polycondensation are carried out with the method according to the invention. The inventors have found that with the latter particular embodiment, a polyamide with a relative viscosity as high as about 4 could be obtained within 5 hours, which constitutes a considerable improvement in process time compared to the method according to the state of the art. Advantageously, no postcondensation (in the solid phase) is needed anymore.

The method according to the invention can be carried out in one or several reactors in series. According to one embodiment, the ring opening and prepolymerisation are carried out in one reactor, the polyaddition and polycondensation are carried out in a separate reactor, placed in series with the previous reactor. In another embodiment, all reactions are carried out in one reactor, preferably with different reaction zones.

The inventors have also found it very useful to store the final polyamide melt, either obtained by prepolymerisation or obtained by polyaddition and polycondensation, after reaching the desired level of viscosity in a reactor in which a self-renewing interface between the molten phase and the gas phase with a large surface/volume ratio of the molten phase is effected at a certain temperature while an amount of inert gas or water in the gas phase is fed to the reactor. In this way, the viscosity can be kept nearly constant as the amount of water can be dosed. With the VK-process according to the state of the art, the problem arises that the polyamide cannot be kept in the reactor without a rise in viscosity, an effect that is undesirable. Such a situation may arise when, for example, the further processing of the polyamide is halted, e.g. as a result of a plant failure. Hence, the invention also relates to said method for storing a polyamide melt at a constant viscosity. In particular, the polyamide melt may be stored with the method according to the invention for more than 2 hours up to a period of at least 6 hours.

The method according to the invention is most suitable for the production of extrusion quality polyamide, in particular film quality, which requires viscosities of at least about 3.4, as measured in formic acid. Not only has the polyamide a low caprolactam content, which is a prerequisite for film quality, the polyamide leaving the reactor can be directly (i.e. as a smelt) used for extrusion purposes, thus eliminating the need for a heating step when a (postcondensed) granulate would be used.

The invention will now be explained in more detail with reference to the following examples.

EXAMPLES

Example I–V

In a 100 l DRAIS TR 100 test reactor fitted with a gas inlet and outlet and pressure controller, 25 kg of caprolactam were melted under a nitrogen gas stream and then, at a pressure of 0.5 MPa, heated to 267±3° C., and 10 kg/h of steam were supplied to the reactor. Steam was then passed over the reaction mixture for the periods specified in the table. The output gas stream was condensed in a vessel containing 520 l of water. Then nitrogen was passed through for the period specified and with the flow rate specified, while the temperature and pressure remained unchanged. The polymerisation was terminated by the reactor pressure being slowly released and the molten polyamide then being allowed to flow from the reactor and cool. The polyamide obtained was assayed in terms of the lactam level, (CL), the cyclic diner level (CD), and the relative viscosity, measured in formic acid, after extraction of lactam and oligomer.

In all the experiments, the reactor agitator, which consisted of a central shaft with 4 arms at fixed distances at an angle of 90°, was used at a constant speed of 45 revolutions per minute. Each arm of the agitator is provided with a specially shaped paddle which enables mixing of the material by shear with the reactor wall and smears it out over the wall.

TABLE 1

Reaction conditions and results of Examples I–V

| | Steam | | $N_2$ | | | | | |
|---|---|---|---|---|---|---|---|---|
| Ex. | Flow rate [kg/h] | Time [h] | Flow rate [kg/h] | Time [h] | Time total [h] | rel. visc. | CL weight % | CD weight % |
| I | 10 | 0.5 | 4.5 | 3 | 3.5 | 3.20 | 3.53 | 0.42 |
| II | 10 | 0.5 | 4.5 | 4½ | 5.0 | 4.02 | 2.64 | 0.48 |
| III | 10 | 0.5 | | | | | | |
| | 25 | 1 | 4.5 | 2 | 3.5 | 3.52 | 2.82 | 0.59 |
| IV | 10 | 0.5 | 4.5 | 3* | 3.5 | 3.51 | 2.08 | 0.58 |
| V | 10 | 0.5 | 4.5 | 3 | 3.5 | 3.24 | 3.49 | 0.48 |

*The pressure was set to 0.1 MPa.

These experiments very clearly show that the method according to the invention, in very short polymerisation times, affords a polyamide having a high relative viscosity. If the conventional methods are employed on an industrial scale, this requires many hours.

The comparison of Examples I and V, the experiment in duplicate, shows good reproducibility.

The caprolactam level and cyclic dimer level of the polyamide are low, which means that a reduced extraction capacity is sufficient.

If an $\eta_{rel}$ in the order of 2.5 is desired, it is sufficient to employ just the first step.

It will be evident to those skilled in the art that the reaction times in the different reaction steps can vary within wide limits and are determined, inter alia, by practical considerations connected to the type of reactor. The residence time in the first reactor (zone) in this context can vary between 0.01 and 5 hours, and the residence time in the second reactor (zone), if present, can vary between 0.1 and 8 hours.

As with the known methods according to the prior art, the temperature in the reactors or reactor zones can vary within wide limits, for example between 200 and 290° C., preferably between 220 and 275° C.

The method can simply be implemented as a continuous process, for example by the Drais reactor after start-up being continuously fed with lactam, and product being discharged, and this product if required being fed to a second reactor and the polymerisation being continued under different conditions.

The other reactor types mentioned in the introduction to the description likewise lend themselves to continuous operation.

What is claimed is:

1. Method for the hydrolytic polymerisation of molten ε-caprolactam to polyamide-6 comprising:
   (a) reacting at least a portion of the ε-caprolactam with water to form the corresponding amino caproic acid; and
   (b) performing polyaddition and polycondensation to form polyamide-6;

wherein at least one of steps (a) and (b) comprises creating a self-renewing interface between the molten phase and the gas phase, with a surface/volume ratio of the molten phase greater than 10 $m^{-1}$.

2. Method according to claim 1 wherein the surface/volume ratio of the molten phase is greater than 40 $m^{-1}$.

3. Method for the hydrolytic polymerisation of molten ε-caprolactam to polyamide-6 comprising:
   (a) reacting at least a portion of the ε-caprolactam with water to form the corresponding amino caproic acid; and
   (b) performing polyaddition and polycondensation to form polyamide-6;

wherein either step (a) or (b) is performed in a reactor chosen from stirred gas bubble scrubbers, horizontal scraped-surface reactors or packed column reactors.

4. Method according to claim 3 wherein the reactor is an horizontal scraped-surface reactor.

5. Method according to claim 1, wherein a self-renewing interface between the molten phase and the gas phase is created in step (a), with a surface/volume ratio of the molten phase greater than 10 $m^{-1}$.

6. Method according to claim 5 wherein step (a) further comprises supplying water via the gas phase.

7. Method according to claim 5, wherein step (a) is performed at a gas pressure greater than atmospheric pressure.

8. Method according to claim 5, wherein the gas phase comprises an inert gas and steam.

9. Method according to claim 5, wherein steam is continuously added to the gas phase.

10. Method according to claim 1, wherein a self-renewing interface between the molten phase and the gas phase is created in step (b), with a surface/volume ratio of the molten phase greater than 10 $m^{-1}$.

11. Method according to claim 10 wherein water is continuously removed from the reactor.

12. Method according to claim 1, wherein a self-renewing interface between the molten phase and the gas phase is created in steps (a) and (b), with a surface/volume ratio of the molten phase greater than 10 $m^{-1}$.

13. Method according to claim 3, wherein the method is carried out in at least two reactors in series.

14. Method according to claim 1, wherein the method is carried out in one reactor with at least two reaction zones.

15. Method for storing a polyamide melt at a constant viscosity comprising storing the melt in a reactor which creates a self-renewing interface between the melt and a gas phase, with a surface/volume ratio of the molten phase greater than 10 $m^{-1}$.

16. The method of claim 1, wherein step (b) is performed under anhydrous reaction conditions.

* * * * *